United States Patent [19]
Choi et al.

[11] Patent Number: 5,835,992
[45] Date of Patent: Nov. 10, 1998

[54] SWITCHING CONTROL SIGNAL GENERATOR FOR SMALL PRECISION MOTOR

[75] Inventors: Hyung-Mook Choi; Shi-Hong Park, both of Seoul, Rep. of Korea

[73] Assignee: Samsung Electronics Co., Ltd., Suwon, Rep. of Korea

[21] Appl. No.: 768,697

[22] Filed: Dec. 18, 1996

[30]  Foreign Application Priority Data

Dec. 28, 1995  [KR]  Rep. of Korea ................... 1995 61314

[51] Int. Cl.[6] .............................. H02K 23/00; H02P 7/00
[52] U.S. Cl. .......................... 318/254; 318/138; 318/439
[58] Field of Search .................. 318/138, 139, 318/245, 254, 260–293, 439

[56]  References Cited

U.S. PATENT DOCUMENTS

| | | | |
|---|---|---|---|
| 4,245,181 | 1/1981 | Plunkett | 318/805 |
| 4,912,378 | 3/1990 | Vukosavic | 318/254 |
| 5,023,527 | 6/1991 | Erdman et al. | 318/254 |
| 5,045,766 | 9/1991 | Vermersch | 318/293 |
| 5,130,620 | 7/1992 | Inaji et al. | 318/254 |
| 5,144,209 | 9/1992 | Ingji et al. | 318/254 |
| 5,182,499 | 1/1993 | Inaji et al. | 318/254 |
| 5,317,243 | 5/1994 | Cameron | 318/254 |
| 5,367,234 | 11/1994 | DiTucci | 318/254 |
| 5,451,832 | 9/1995 | Cameron et al. | 318/375 |
| 5,481,167 | 1/1996 | Rohrbaugh et al. | 318/254 |
| 5,512,805 | 4/1996 | Rohrbaugh et al. | 318/254 |
| 5,517,095 | 5/1996 | Carobolante et al. | 318/254 |
| 5,525,874 | 6/1996 | Mallarapu et al. | 318/254 |
| 5,572,097 | 11/1996 | Cameron | 318/254 |
| 5,619,109 | 4/1997 | Cameron et al. | 318/375 |
| 5,631,999 | 5/1997 | Dinsmore | 388/805 |
| 5,661,382 | 8/1997 | Enami et al. | 318/439 |

*Primary Examiner*—Paul Ip
*Attorney, Agent, or Firm*—Jones & Volentine, L.L.P.

[57]  ABSTRACT

A switching control signal generator generates a switching control signal which results in a soft switching operation in a small precision motor such as a brushless DC motor, without use of a separate switching noise reduction circuit, includes a circuit for supplying a linear slope value of the current supplied during a switching period of the switch using a back electromotive force for each phase and a neutral point voltage of the motor, and a circuit for adjusting a switching period by the thus supplied slope value.

6 Claims, 3 Drawing Sheets

5,835,992

SWITCHING CONTROL SIGNAL GENERATOR FOR SMALL PRECISION MOTOR

BACKGROUND OF THE INVENTION

1. Field of the Invention

The present invention relates to a circuit for generating a switching control signal for a switch connected to each phase of a small precision motor, and more particularly, to a switching control signal generator for generating an on off switching control signal for a switch connected to each phase of a three phase brushless DC motor (herein called a BLDC motor).

2. Description of the Prior Art

Most small precision motors currently used in the electronic industry are BLDC motors. In order to start such motors, a magnetic pole detector has been commonly employed for detecting the position of a rotor. However, the current trend is to rely on a back electromotive force generated during the rotation of a motor to start the BLDC motor, without use of a magnetic pole detector. In particular, when a small BLDC motor is driven using a motor driving integrated circuit (IC), a current-type driving method is typically adopted in which a square wave current is applied to the motor.

In such a case of driving the motor by applying a square wave current, in terms of the characteristics of the square wave, since a switch connected to each phase of the motor is instantaneously turned on or off, the back electromotive force caused by the internal inductance of each phase increases substantially, thereby generating a significant amount of switching noise. This in turn can result in erroneous operation of the motor driving IC and the motor.

In an effort to overcome such a problem, a method for controlling an on/off state of the switch of each motor phase has been proposed in which a filter is formed in the exterior of the motor using a RC element and a point is searched at which the back electromotive force of each phase is electrically delayed by 30° after the back electromotive force of each phase passes by a zero point. However, poor frequency response characteristics cause an angle of delay from initialization to normal operation to vary with the speed of the rotating motor, and thus this method cannot exert an optimum performance. Another solution is to use a digital circuit to search for the current timing. However, the method requires the separate provision of a circuit for detecting a zero point and a circuit for generating an angle of delay.

SUMMARY OF THE INVENTION

Accordingly, the present invention has been made with a view toward overcoming the drawbacks occurring in the prior art, and an object of the present invention is to provide a switching control signal generator for generating a signal which results in a soft switching operation so as to reduce a switching noise, without use of a separate circuit, in a small precision motor such as a BLDC motor.

To accomplish the above object, there is provided a circuit for generating a switching control signal for a switch of each phase of a small precision motor, comprising: means for supplying a linear slope value of the current supplied during a switching period of the switch using a back electromotive force for each phase and a neutral point voltage of the motor; and means for adjusting a switching period of a switching control signal in accordance with the slope value supplied from the slope value supplying means.

BRIEF DESCRIPTION OF THE DRAWINGS

The above objects, and other features and advantages of the present invention will become more apparent by describing in detail a preferred embodiment thereof with reference to the attached drawings, in which.

DETAILED DESCRIPTION OF THE PREFERRED EMBODIMENT

Figure 1:
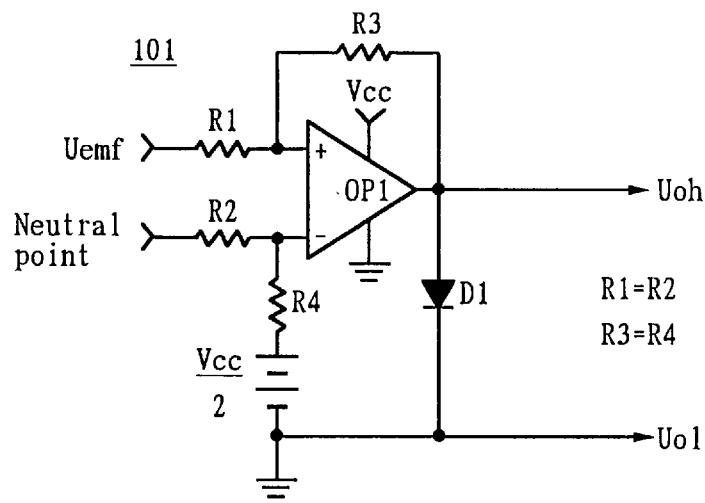
FIGS. 1A through 1D are detailed diagrams of a switching control signal generator for a small precision motor according to the present invention.
Figure 1:
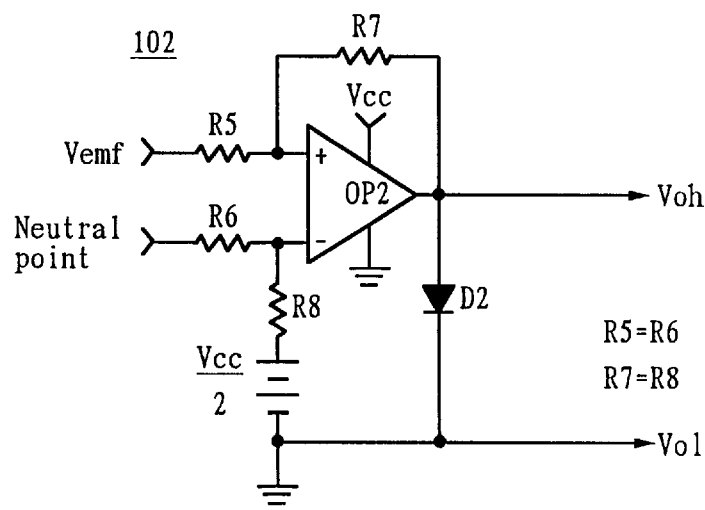
Figure 1:
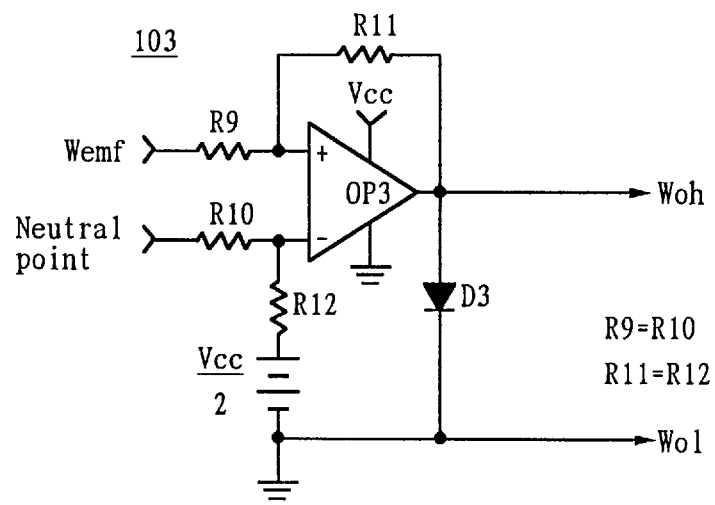
Figure 1:
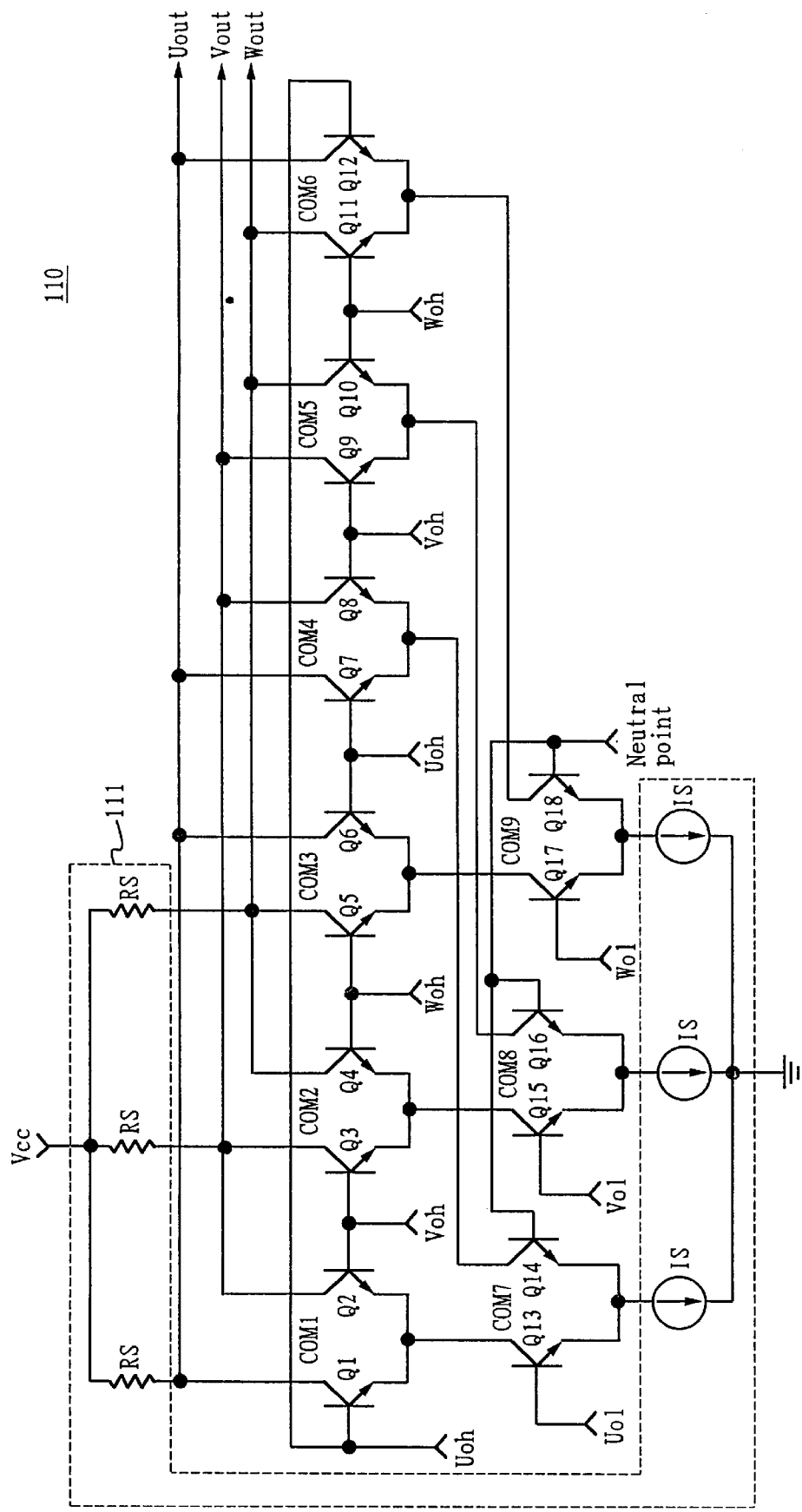

FIGS. 1A through 1C show slope value supply circuits 101, 102 and 103 which receive the back electromotive forces Uemf, Vemf and Wemf and neutral point voltages for each respective phase of a brushless DC motor and which supply a slope value causing the current supplied during the switching of each phase to have linear characteristics. FIG. 1A shows the slope value supply circuit 101 for the back electromotive force Uemf, FIG. 1B shows the slope value supply circuit 102 for the back electromotive force Vemf, and FIG. 1C shows the slope value supply circuit 103 for the back electromotive force Wemf. FIG. 1D shows a switching period adjusting circuit 110 for adjusting a switching period according to the value output from the slope value supplying circuits 101, 102 and 103.

The slope value supply circuits shown in FIGS. 1A through 1C are constituted by three input amplifiers OP1, OP2 and OP3 for receiving the electromotive forces Uemf, Vemf and Wemf and neutral point voltages for each respective phase of the motor, three diodes D1, D2 and D3 for outputting respective voltages Uoh, Voh and Woh indicative of the slope during the switching of each phase, and output from the input amplifiers OP1, OP2 and OP3 as voltages Uol, Vol and Wol each reduced by 0.7V, and resistors R1 through R12, connected as shown to the input amplifiers OP1, OP2 and OP3, for adjusting the respective amplification factors of the differences between the applied back electromotive forces Uemf, Vemf and Wemf and neutral point voltages of each phase of the motor.

The switching period adjusting circuit 110 shown in FIG. 1D is constituted by six comparators COM1 through COM6 each having an emitter coupled pair for receiving the voltages Uoh, Uol, Voh, Vol, Woh and Wol output from the respective input amplifiers OP1, OP2 and OP3 of the slope value supply circuits 101, 102 and 103, three comparators COM7 through COM9 each having an emitter coupled pair for receiving and comparing the voltages Uol, Vol and Wol output via the diodes D1, D2 and D3, and an output voltage level determining circuit 111 for determining the level of the output voltages supplied to the switch of each respective phase, as adjusted and output by the comparators COM 1 through COM9.

Here, the output voltage level determining circuit 111 is constituted by resistances Rs connected between a supply power Vcc and collectors of the respective comparators COM1, COM2 and COM3, and current sources IS connected between emitters of the respective comparators COM7, COM8 and COM9 and a ground port. The output voltages Uout, Vout and Wout are generated via the supply power Vcc and resistances Rs.

The operation of the circuit configured as above will now be described.

First, the electromotive forces Uemf, Vemf and Wemf and the neutral point voltages are supplied from each respective phase of the motor. The electromotive forces Uemf, Vemf and Wemf are supplied to one input terminal of the respective input amplifiers OP1, OP2 and OP3, and the neutral point voltages are at the same time supplied to the other input terminal of the respective input amplifiers OP1, OP2 and OP3. The respective input amplifiers OP1, OP2 and OP3 amplify the differences between the corresponding applied back electromotive forces and neutral point voltages according to amplification factors set by the resistances R1 through R12 connected to the respective input terminals and feedback paths of the amplifiers OP1, OP2 and OP3. At this time, if the amplification factor is large, a switching control signal which is akin to a square wave is supplied which remains for a short time in a linear region of the on/off switching period. If the amplification factor is small, the switching control signal remains a longer time in a linear region of the on/off switching period. In other words, if the amplification factor is large, the on/off switching period is sharp. However, if the amplification factor is small, the on/off switching period varies a blunt manner. Therefore, as is intended by the present invention, in order to attain a soft switching operation, the values of the resistances R1 through R12 connected to the respective input amplifiers OP1, OP2 and OP3 are set so as to result in a small amplification factor. By accordingly setting the values of the resistances R1 through R12, a soft switching operation is achieved during a high speed rotation of the motor.

As described above, the difference values Uoh, Voh and Woh between the back electromotive forces and neutral point voltages of each respective phase, amplified and output from the respective input amplifiers OP1, OP2 and OP3, are input to bases of transistors Q1 through Q12 provided in the comparators COM1 through COM6 of the switching period adjusting circuit 110. The difference values Uol, Vol and Wol output via the diodes D1, D2 and D3 are transmitted to one input terminal of the respective comparators COM7, COM8 and COM9 of the switching period adjusting circuit 110.

In the comparator COM1, configured by an emitter coupled pair, an on/off state of the transistors Q1 and Q2 is determined by the respective magnitudes of the difference values Uoh and Voh applied to the bases of the respective transistors Q1 and Q2.

In the comparator COM2, an on/off state of the transistors Q3 and Q4 is determined by the respective magnitudes of the difference values Voh and Woh applied to the bases of the respective transistors Q3 and Q4.

In the comparator COM3, an on/off state of the transistors Q5 and Q6 is determined by the respective magnitudes of the difference values Woh and Uoh applied to the bases of the respective transistors Q5 and Q6.

In the comparator COM4, an on off state of the transistors Q7 and Q8 is determined by the respective magnitudes of the difference values Uoh and Voh applied to the bases of the respective transistors Q7 and Q8.

In the comparator COM5, an on/off state of the transistors Q9 and Q10 is determined by the respective magnitudes of the difference values Voh and Woh applied to the bases of the respective transistors Q9 and Q10.

In the comparator COM6, an on/off state of the transistors Q11 and Q12 is determined by the respective magnitudes of the difference values Woh and Uoh applied to the bases of the respective transistors Q11 and Q12.

In the comparator COM7, an on off state of the transistors Q13 and Q14 is determined by the respective magnitudes of the output Uol of the input amplifier OP1 and the neutral point voltage, and a collector of the transistors Q13 is coupled to an emitter of the comparator COM1 and a collector of the transistors Q14 is coupled to an emitter of the comparator COM4.

In the comparator COM8, an on/off state of the transistors Q15 and Q16 is determined by the respective magnitudes of the output Vol of the input amplifier OP2 and the neutral point voltage applied to bases of the respective transistors Q15 and Q16, and a collector of the transistor Q15 is coupled to an emitter of the comparator COM2 and a collector of the transistor Q16 is coupled to an emitter of the comparator COM5.

In the comparator COM9, an on/off state of the transistors Q17 and Q18 is determined by the respective magnitudes of the output Wol of the input amplifier OP3 and the neutral point voltage applied to bases of the respective transistor Q17 and Q18, and a collector of the transistors Q17 is coupled to an emitter of the comparator COM3 and a collector of the transistor Q18 is coupled to an emitter of the comparator COM6.

Figure 2:
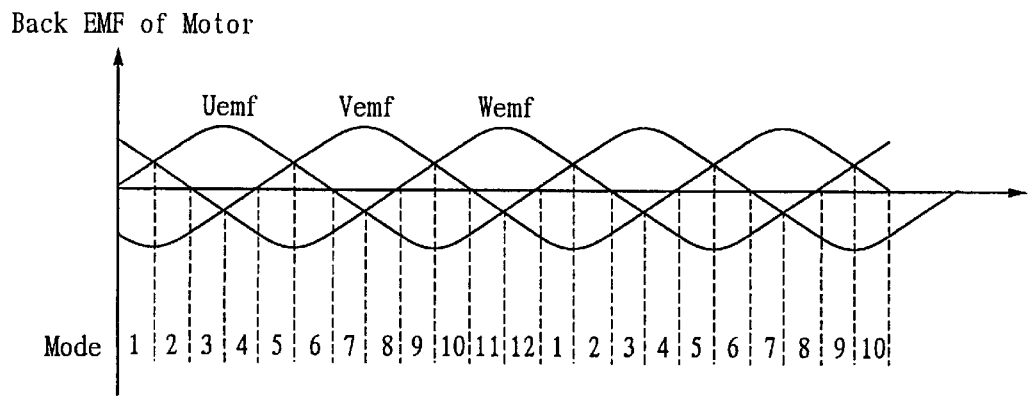
FIG. 2 shows the relationship between the back electromotive force of the motor and twelve operational modes.

When a period of the back electromotive force induced during the rotation of the three-phase BLDC motor is divided into 12 modes, as shown in FIG. 2, the switched states of the transistors Q1 through Q18 of the comparators COM 1 through COM8 are as indicated in Table 1 below. The output voltages Uout, Vout and Wout are as indicated in Table 2 below.

TABLE 1

|  | 1 | 2 | 3 | 4 | 5 | 6 | 7 | 8 | 9 | 10 | 11 | 12 |
|---|---|---|---|---|---|---|---|---|---|---|---|---|
| Q1 | ON | ON | ON | ON | OFF | OFF | OFF | OFF | OFF | OFF | ON | ON |
| Q2 | OFF | OFF | OFF | OFF | ON | ON | ON | ON | ON | ON | OFF | OFF |
| Q3 | OFF | OFF | ON | ON | ON | ON | ON | ON | OFF | OFF | OFF | OFF |
| Q4 | ON | ON | OFF | OFF | OFF | OFF | OFF | OFF | ON | ON | ON | ON |
| Q5 | OFF | OFF | OFF | OFF | OFF | OFF | ON | ON | ON | ON | ON | ON |
| Q6 | ON | ON | ON | ON | ON | ON | OFF | OFF | OFF | OFF | OFF | OFF |
| Q7 | ON | ON | ON | ON | OFF | OFF | OFF | OFF | OFF | OFF | ON | ON |
| Q8 | OFF | OFF | OFF | OFF | ON | ON | ON | ON | ON | ON | OFF | OFF |
| Q9 | OFF | OFF | ON | ON | ON | ON | ON | ON | OFF | OFF | OFF | OFF |
| Q10 | ON | ON | OFF | OFF | OFF | OFF | OFF | OFF | ON | ON | ON | ON |
| Q11 | OFF | OFF | OFF | OFF | OFF | OFF | ON | ON | ON | ON | ON | ON |
| Q12 | ON | OFF | ON | ON | ON | ON | OFF | OFF | OFF | OFF | OFF | OFF |
| Q13 | ON | ON | ON | ON | ON | OFF | OFF | OFF | OFF | OFF | OFF | ON |
| Q14 | OFF | ON | OFF | OFF | OFF | ON | ON | ON | ON | ON | ON | OFF |
| Q15 | OFF | OFF | OFF | ON | ON | ON | ON | ON | ON | OFF | OFF | OFF |
| Q16 | ON | ON | ON | OFF | OFF | OFF | OFF | FF | OFF | ON | ON | ON |
| Q17 | ON | OFF | OFF | OFF | OFF | OFF | OFF | ON | ON | ON | ON | ON |
| Q18 | OFF | ON | ON | ON | ON | ON | ON | OFF | OFF | OFF | OFF | OFF |

TABLE 2

| Mode/Output | Uout | Vout | Wout |
| --- | --- | --- | --- |
| 1 | Vcc-(2 × Rs × Is) | Vcc | Vcc-(Rs × Is) |
| 2 | Vcc-(2 × Rs × Is) | Vcc | Vcc-(Rs × Is) |
| 3 | Vcc-(2 × Rs × Is) | Vcc-(Rs × Is) | Vcc |
| 4 | Vcc-(2 × Rs × Is) | Vcc-(Rs × Is) | Vcc |
| 5 | Vcc-(Rs × Is) | Vcc-(2 × Rs × Is) | Vcc |
| 6 | Vcc-(Rs × Is) | Vcc-(2 × Rs × Is) | Vcc |
| 7 | Vcc | Vcc-(2 × Rs × Is) | Vcc-(Rs × Is) |
| 8 | Vcc | Vcc-(2 × Rs × Is) | Vcc-(Rs × Is) |
| 9 | Vcc | Vcc-(Rs × Is) | Vcc-(2 × Rs × Is) |
| 10 | Vcc | Vcc-(Rs × Is) | Vcc-(2 × Rs × Is) |
| 11 | Vcc-(Rs × Is) | Vcc | Vcc-(2 × Rs × Is) |
| 12 | Vcc-(Rs × Is) | Vcc | Vcc-(2 × Rs × Is) |

As is apparent from Table 2, the values of the output voltages Uout, Vout and Wout for the respective modes are determined by the resistances Rs coupled between the supply voltage Vcc and the collectors of the respective transistors Q1, Q3 and Q5 of the comparators COM1, COM2 and COM3, and by the current sources IS coupled to the emitters of the respective comparators COM7, COM8 and COM9.

In the case two of the outputs of the input amplifiers OP1, OP2 and OP3 are compared using the emitter coupled pair, since the ratio of the current flowing in the two switches of the emitter coupled pair, e.g., transistors Q1 and Q2, is changed exponentially, the output voltages are changed exponentially at the moment of switching.

Figure 3:
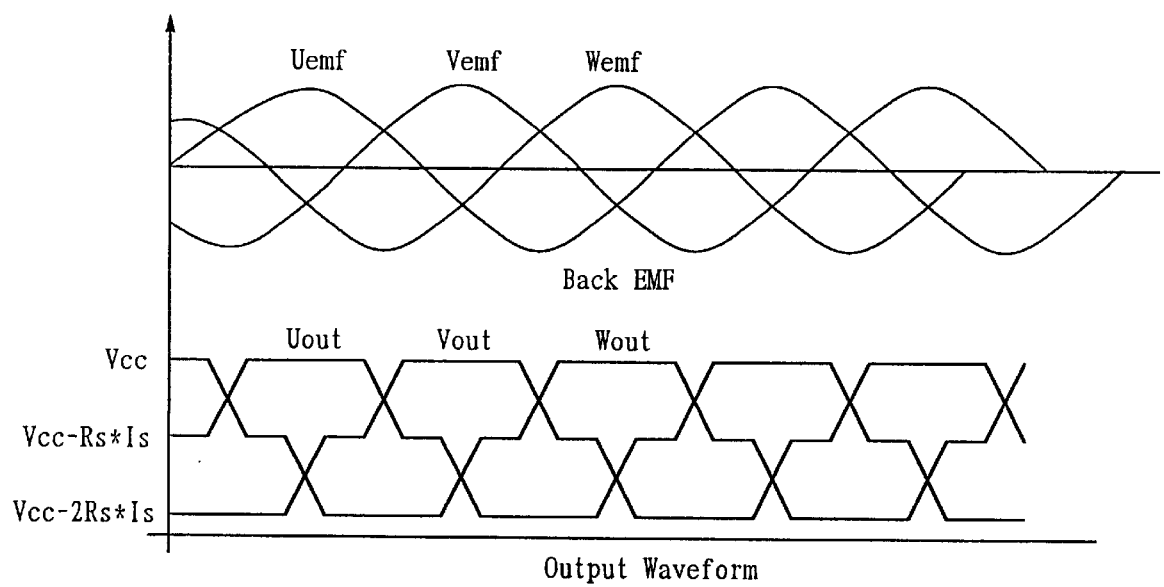
FIG. 3 shows the relationship between the back electromotive force of the motor and various voltages output from the switching control signal generator according to the present invention.

In other words, while the output difference of the input amplifiers is in the linear region of the emitter coupled pair, i.e., the region where the difference of the electromotive forces ranges from $-2 \times Vt$ to $2 \times Vt$ (here, Vt represents a thermal voltage), the output voltages have rhombic waveforms, as shown in FIG. 3. If the output difference of the input amplifiers exceeds $4 \times Vt$, the current flow is substantially in one switch only.

The output voltages Uout, Vout and Wout generated in the circuit according to the present invention are input to a transconductance amplifier (not shown), and a current waveform which is the same as the voltage waveform is transmitted to the switch of each phase of the motor.

As described above, in the three phase BLDC motor according to the present invention, by using input amplifiers for amplifying the difference between an electromotive force and neutral point voltage of each respective phase and by using comparators each configured by an emitter coupled pair, the switching period is increased so that the current supplied during the switching of each phase exhibits a linear characteristic. Thus, the switch coupled to each phase of the motor may be slowly turned on or off, and motor malfunctions caused by switching noise can thus be prevented.

While the present invention has been described and illustrated with reference to a preferred embodiment thereof, it is to be readily understood that the present invention is not limited to the embodiment, and various changes and modifications can be made therein without departing from the spirit and scope of the invention defined in the appended claims.

What is claimed is:

1. A circuit for generating a switching control signal for a switch of each phase of a small precision motor, comprising;

slope value supply means for supplying a linear slope value of the current supplied during a switching period of said switch using a back electromagnetic force and a neutral point voltage for each respective phase of said motor; and switching signal generation means for generating the switching control signal and adjusting a switching period of the switching control signal according to the slope value supplied from said slope value supply means, wherein said slope value supply means includes a plurality of input amplifiers corresponding in number to a number of phases of the motor and amplifying a difference between the back electromotive force and the neutral point voltage of each respective phase of the motor to output a plurality of corresponding difference values, and wherein said switching signal generation means includes a plurality of comparators each having an emitter coupled pair for comparing two of the difference values output from said plurality of input amplifiers and for outputting a voltage which changes exponentially.

2. A circuit as claimed in claim 1, wherein said switching signal generation means includes means for determining output levels of the output voltages of each phase.

3. A circuit as in claim 1, wherein three back electromotive forces are generated from three respective phases of said small precision motor.

4. A circuit for generating a switching control signal for a switch of each of three phases of a small precision motor, comprising, slope value supply means for supplying a linear slope value of the current supplied during a switching period of said switch using a back electromagnetic force and a neutral point voltage for each respective phase of said motor; and switching signal generation means for generating the switching control signal and adjusting a switching period of the switching control signal according to the slope value supplied from said slope value supply means, wherein said slope value supply means includes three input amplifiers for amplifying differences between three back electromotive forces and the neutral point voltage of each of the three phases of the motor to output three corresponding difference voltages and three diodes coupled to respective outputs of said three input amplifiers to obtain respective diode voltages, and wherein said switching signal generation means includes first through sixth comparators each having an emitter coupled pair for comparing respective pairs of the difference values output from said input amplifiers, and seventh through ninth comparators each having an emitter coupled pair for comparing a respective one of the diode voltages output through said diodes with said neutral point voltages.

5. A circuit as claimed in claim 4, wherein said switching signal generation means further includes means for determining output levels of the output voltages of each phase.

6. A circuit as claimed in claim 5, wherein said output voltage level determining means includes a power supply, resistances connected between said power supply and collectors of said respective first through third comparators, and current sources connected to emitters of said respective seventh through ninth comparators.

* * * * *